United States Patent
Woodbury et al.

(10) Patent No.: US 12,250,941 B2
(45) Date of Patent: Mar. 18, 2025

(54) PESTICIDAL VAPOR RELEASE DEVICES AND COMPOSITIONS

(71) Applicant: S. C. Johnson & Son, Inc., Racine, WI (US)

(72) Inventors: Nathan Woodbury, Burnaby (CA); Robert James Etsu Takeuchi, Vancouver (CA); Steven Lin, Vancouver (CA); Anthony Hoover, Vancouver (CA); Shannon Pyke, Calgary (CA)

(73) Assignee: S. C. JOHNSON & SON, INC., Racine, WI (US)

( * ) Notice: Subject to any disclaimer, the term of this patent is extended or adjusted under 35 U.S.C. 154(b) by 280 days.

(21) Appl. No.: 17/180,567

(22) Filed: Feb. 19, 2021

(65) Prior Publication Data

US 2021/0259232 A1    Aug. 26, 2021

Related U.S. Application Data

(60) Provisional application No. 62/979,116, filed on Feb. 20, 2020.

(51) Int. Cl.
    *A01M 1/20*    (2006.01)
(52) U.S. Cl.
    CPC .................. *A01M 1/2027* (2013.01)
(58) Field of Classification Search
    CPC .............................. A01M 1/20; A01M 1/2022
    USPC ................... 43/124, 129, 131, 132.1
    See application file for complete search history.

(56) References Cited

U.S. PATENT DOCUMENTS

| | | | | |
|---|---|---|---|---|
| 2,755,968 | A | * | 7/1956 | Fiant .................. E04F 21/165 401/265 |
| 3,605,321 | A | * | 9/1971 | Lazarus ............. A01M 1/2055 43/131 |
| 4,160,336 | A | * | 7/1979 | Query ................ A01M 17/002 43/132.1 |
| 4,705,218 | A | * | 11/1987 | Daniels ............... A01G 29/00 239/548 |
| 4,756,118 | A | | 7/1988 | Evans, II |
| 4,823,505 | A | * | 4/1989 | Jackson .................. E04B 1/72 43/124 |
| 5,054,231 | A | | 10/1991 | Witherspoon |
| 5,109,629 | A | * | 5/1992 | King, Jr. ............ A01M 17/002 239/289 |
| 5,319,878 | A | | 6/1994 | Moffett et al. |
| 5,325,626 | A | * | 7/1994 | Jackson .............. A01M 17/002 43/132.1 |

(Continued)

OTHER PUBLICATIONS

Adams et al. (2011). Raft formation by the red imported fire ant, *Solenopsis invicta*. Journal of Insect Science 11: 171.

(Continued)

*Primary Examiner* — Joshua J Michener
*Assistant Examiner* — Nicole Paige Maccrate
(74) *Attorney, Agent, or Firm* — Quarles & Brady LLP

(57) ABSTRACT

A release device for a vaporizable and/or sublimateable pesticide is provided. The release device is suitable for use against subterranean pests (e.g. fire ants). The release device may be driven into and/or placed in a cavity within the soil or other substrate where the pests reside. The release device comprises a vapor injector which releases the pesticidal composition through apertures into the pest habitat, where it is distributed in vapor form.

14 Claims, 6 Drawing Sheets

(56) References Cited

U.S. PATENT DOCUMENTS

| | | | | |
|---|---|---|---|---|
| 5,548,921 | A * | 8/1996 | Kleisath | A01M 25/006 43/124 |
| 5,746,021 | A * | 5/1998 | Green | A01M 1/2005 43/132.1 |
| 6,079,149 | A * | 6/2000 | Hastings | A01M 1/00 43/132.1 |
| 7,096,622 | B2 * | 8/2006 | James | A01M 1/2038 43/124 |
| 8,677,680 | B2 | 3/2014 | Schuster | |
| 9,999,218 | B2 | 6/2018 | Manhas et al. | |
| 9,999,227 | B2 | 6/2018 | Manhas et al. | |
| 2005/0155278 | A1 | 7/2005 | Rawls | |
| 2009/0031611 | A1 * | 2/2009 | Traniello | A01M 1/026 43/124 |
| 2016/0286782 | A1 | 10/2016 | Manhas et al. | |
| 2017/0290324 | A1 * | 10/2017 | Rocha | A01M 21/04 |
| 2018/0116198 | A1 | 5/2018 | Manhas et al. | |

OTHER PUBLICATIONS

Allen et al., (2015). Field evaluations of Broadcast, and Individual Mound Treatments for Red Imported Fire Ant, *Solenopsis invicta* Buren, (Hymenoptera: Formicidae) Control in Virginia, USA. Sociobiology 62: 10-17.

Barr et al., (1994). Results from the Texas veterinarian survey: Impact of red imported fire ants on animal health. In: Proc, 1994 Imported Fire Ant Conference. May 9-11. Mobile, AL. 12.

Callcott et al. (2011). Fire ant decapitation fly cooperative release programs (1994-2008): two Pseudacteon species, *P. tricuspis* and *P. curvatus*, rapidly expand across imported fire ant populations in the southeastern United States. Journal of Insect Science 11: 19.

Cassill et al., (2002). Nest complexity, group size and brood rearing in the fire ant, *Solenopsis invicta*. Insectes Sociax 49: 158-163.

Chen (2016). Toxicity and efficacy of two emulsifiable concentrates of tridecanone against red imported fire ants. Advances in Entomology 4: 37-46.

Drees et al. (1996). Managing imported fire ants in urban areas. Texas Agricultural Extension Service B-6043, 15M-9-96-revision.

Drees et al. (2013). Integrated pest management concepts for red imported fire ants *Solenopsis invicta* (Hymenoptera: Formicidae). Insect Science 20: 420-438.

Hemmer (2014). Cross reactions between Hymenoptera venoms from different families, genera and species. Hautarzt. 65(9): 775-9.

Huanjiong et al. (2018). Potential range expansion of the red imported fire ant (*Solenopsis invicta*) in China under climate change. Journal of Geographical Science.

Jennings (2004). Notes from the field: A brief history of the red imported fire ant eradication program. The Australian Journal of Emergency Management 19: 97-100.

Jetter et al. (2002). Eradication costs calculated: Red imported fire ants threaten agriculture, wildlife and homes. California Agriculture 56: 26-34.

Kruse et al. (updated 2019). Fire Ant Bites. In: StatPearls. StatPearls Publishing 2019. https://www.ncbi.nlm.nih.gov/books/NBK470576/.

Lard et al. (2001). The economic impact of the red imported fire ant on the homescape, landscape, and the urbanscape of selected metroplexes of Texas: a part of the Texas fire ant initiative 1997-1999.

Moloney et al. (2002). Red imported fire ants: A threat to eastern Australia's wildlife? Ecological Management and Restoration 3: 167-175.

Na et al. (2001). Identification key to common urban pest ants in Malaysia. Tropical Biomedicine 18: 1-17.

Nester et al. (2019). Broadcast baits for fire ant control—ant pests. Available at: https://ant-pests.extension.org/broadcast-baits-for-fire-ant-control/ [accessed Dec. 9, 2019].

Prahlow et al. (1998). Fatal anaphylaxis due to fire ant stings. The American Journal of Foresnic Medicine and Pathology 19: 137-142.

Porter et al. (2004) Establishment and dispersal of the fire ant decapitating fly *Pseudacteon tricuspis* in North Florida. Biological Control 29: 179-188.

Reed et al. (1999). Comparison of two treatment methods and four insecticides for control of individual fire ant mounds. Mississippi Agricultural and Forestry Experiment Station Bulletin b1080.

Vander Meer et al. (2017). Enhanced pest ant control with hydrophobic bait. Journal of Economic Entomology 110: 567-574.

Villada et al. (2017). Imported fire ant envenomation: A clinicopathologic study of a recognizable form of arthropod assault reaction. J. Cutan. Pathol. 44(12):1012-1017.

Vinson (1997). Invasion of the red imported fire ant (Hymenoptera: Formicidae): Spread, biology, and impact. Am. Entomol. 43: 23-39.

Vogt et al. (2002) Efficacy of three citrus oil formulations against Solenopsis invicta buren (Hymenoptera: Formicidae), the red imported fire ant. Journal of Agricultural Entomology 19: 159-171.

Williams (1983). The development of toxic baits for the control of the imported fire ant. Florida Entomologist 66: 162-172.

Williams (1994). Control of the introduced pest, the imported fire ant, *Solenopsis invicta*, in the United States. in: Exotic ants: biology, impact, and control of introduced species. Westview Press, Boulder (CO). pp. 282-292.

Wodjcik (1983). Symposium on imported fire ants: Comparison of the ecology of red imported fire ants in North and South America. Florida Entomologist 66: 101-111.

Wodjcik et al. (2001). Red imported fire ants: impact on biodiversity. Nebraska Cooperative Fish & Wildlife Reserach Unit—Staff Publications. 47.

Wylie et al. (2016). Eradication of two incursions fo the red imported fire ant in Queensland, Australia. Ecological Management & Restoration 17: 22-32.

Yu-Tzu (2004). Agencies will collaborate to control outside species. Taipei Times. Taipei, Taiwan. May 2, p. 2.

* cited by examiner

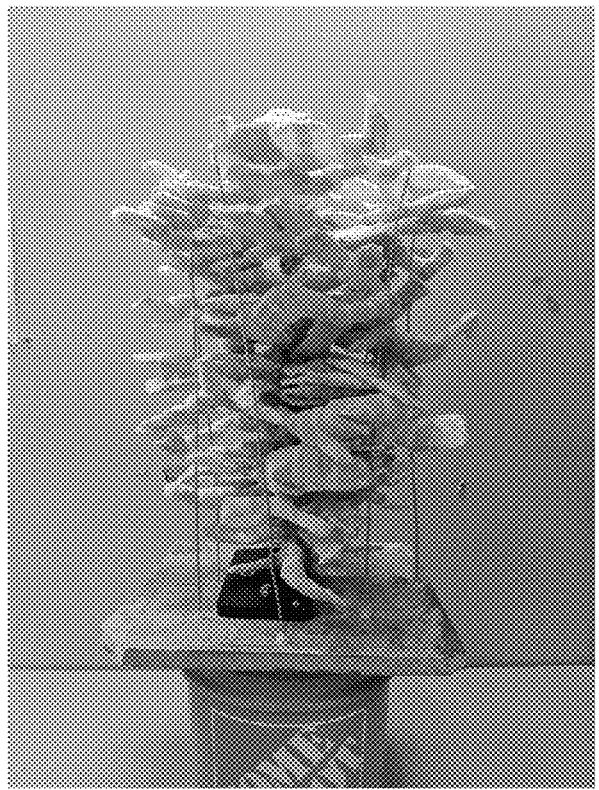 
FIGURE 5A
FIGURE 5B

PESTICIDAL VAPOR RELEASE DEVICES AND COMPOSITIONS

TECHNICAL FIELD

The present disclosure relates generally to compositions and/or devices that can be used to control a variety of pests. Some embodiments of the present invention can be used to control subterranean pests such as ants (e.g. fire ants, carpenter ants), termites, beetles and moths. Some embodiments of the present invention are compositions and/or devices that release vapors having pesticidal activity.

BACKGROUND

A variety of pests establish subterranean habitats, such as mound, nests, hills, tubes, and so on. These can impose various challenges for pest control. Such habitats may be treated (e.g. via application of pesticide) individually and/or on a larger scale. An example of such pests are red imported fire ants, *Solenopsis invicta*, although the present disclosure is not limited to red imported fire ants and may be applied, where suitable, to other fire ants, other ants, other insects, other arthropods, and/or other phyla of pests.

Red imported fire ants are a particularly challenging subterranean pest to control. They are native to South America and are now invasive in North America, Australia, Malaysia, Taiwan, and China. Expansion of this ant species outside of its native range is possible because fire ants often colonize environments altered by human activity and inhabit soil and materials that are dispersed by humans. Fire ants are also capable of surviving on a wide variety of prey and defend their colonies more aggressively than other ant species, allowing them to survive attacks by competing ants whenever they expand to new areas. Additionally, reproductive fire ants fly to new locations to establish new colonies and colonies are also capable of forming floating mats that accelerate colony expansion throughout areas that are prone to flooding.

Red imported fire ants possess a stinger at the caudal tip of their abdomen which they use to immobilize prey. If a red imported fire ant mound is disturbed by an animal or human, the ants aggressively swarm the mound's surface, then grasp and inject venom into any nearby animals or humans. Attacking fire ants will typically inflict multiple painful stings which cause redness, swelling and pustules to form under the skin at the location of the bite. The venom can also cause a potentially fatal anaphylactic reaction in humans. Due to these medical risks, attempts are continuously made to manage or completely eliminate fire ants from human-occupied land on both a local scale (e.g. parks, playing fields, backyards) and on a county or state level. These treatment efforts can cost hundreds of millions of dollars.

Fire ants commonly establish colonies in agricultural areas where they are a risk to agricultural workers and to livestock. To reduce the spread of fire ants, many agricultural industries require agricultural produce, equipment and soil to be treated or quarantined if there is a risk it may contain fire ants. Fire ant control in these agricultural areas is necessary but requires continuous monitoring, treatment and prevention. For example, it is estimated that if fire ants became established in California, control measures would cost the agricultural industry as much as $1 billion per year.

Fire ant mound treatments can generally be classed as belonging to one of two general categories: large-scale treatments and individual mound treatments.

Large-scale treatments of fire ant mounds are generally intended to kill all fire ants over a large area of land. This type of treatment can be useful when multiple ant mounds are scattered across agricultural land or when there is a desire to control fire ants over a large region where identification and treatment of individual mounds is not feasible, for instance due to landscape or presence of private properties (e.g. treatment of entire municipalities or counties).

The most commonly used large-scale fire ant treatments are insecticidal baits (containing slow-acting insecticide or insect growth regulator combined with an attractant food source) or granular insecticides (eg. abamectin, boric acid, fenoxycarb, hydramethylnon, methoprene, pyriproxyfen, spinosad). These baits or insecticidal granules are broadcast over a landscape where foraging fire ants collect and consume the granules, eventually feeding the pesticide to the queen ant. This results in death of foraging ants and the queen which eventually kills the colony. Most baits or insecticidal granules continue to work for several months and can be easily applied by scattering around the landscape. The treatments are randomly scattered around the landscape and rely on random encounters by ants before they can be effective. For this reason, these treatments are inherently imprecise and relatively slow-acting. This imprecision can be compensated for by applying large volumes of treatment (e.g. 1-20 lbs/acre of bait or 60 lbs/acre of insecticidal granules, as described by Nester et al. 2019, cited below) or by using a formulation that is nutritious to ants so is readily carried back to ant mounds by foragers (e.g. as described by Williams 1983 and Allen & Miller 2015, cited below). Although baits and insecticidal granules can effectively suppress ant populations, it is common for ant populations to recover in the treated mounds. This can occur if ants are repelled by the insecticidal granule, if ants are not interested in the bait ingredients at that time of the season, or water-labile bait has been ruined after exposure to rain or other dampness. It is also likely that effective doses of insecticidal granules or baits are often not transferred throughout the entirety of the mound, to queens and workers that can re-populate the colony.

Some additional risks associated with insecticidal granules is the toxicity of their active ingredient which requires applicators to wear protective equipment or even possess a pesticide applicator's license. The active ingredients in baits tend to be less toxic to humans, but can cause harm to aquatic life, so at least some such baits should not be applied near waterways.

An alternative method used to control fire-ants on a large scale is to release parasitic flies that develop as larvae within the fire-ant's body, eventually decapitating and killing the ant. Parasitic flies do not need to be placed directly on a fire ant mound-they are capable of locating fire-ants and moving toward infested locations. In the correct conditions, these flies are also a long-lasting because once they are released, they continually reproduce as long as there are ants to parasitize. Although fire-ant parasitic flies are tend to establish around fire ant populations, they have not eliminated fire-ants in many of the areas where they were released, and they are often unable to establish in colder Northern areas. Another drawback to this method is parasitic flies are not easy obtained by the general public, nor are they easy for the general public, or professionals to apply to specific fire ant mounds.

Individual treatments of fire ant mounds are intended to treat a single mound and kill the entire ant population within that mound. This treatment approach is particularly useful for smaller land areas that possess only a small number of mounds and the land is used heavily by people or pets (eg. playgrounds, playing fields, backyards, and sidewalks). Fire ant mounds in these areas need to be eliminated as quickly as possible so a fast-acting, focused treatment is often preferred. It is important that an individual mound treatment kills all of the queens within the mound because any surviving queens can re-establish the colony or start a new colony.

Individual mound treatments can also be combined with bait treatments to improve efficacy of fire-ant eradication programs. For example, fire ants were completely eradicated from Yarwun Australia by locating individual fire ant mounds and injecting them with Fipronil (a contact insecticide), followed by application of baits (e.g. as described by Wylie et al. 2016, cited below). Similarly, the state of Virginia has successfully treated fire ant mounds by first applying baits to individual mounds followed by drenching the mound with acephate insecticide (e.g. as described by Allen & Miller 2015, cited below).

Drenching is the most common method for treating individual fire-ant mounds. Some drenching liquids (often called "drenches") contain a synthetic insecticide (eg. acephate, deltamethrin, cyfluthrin, permethrin, bifenthrin, bendicarb, chlorpyrifos, carbaryl, diazinon, cyfluthrin, lamba-cyhalothrin, d-limonene, pyrethrum (pyrethrins), rotenone, spinosad, indoxacarb, or hydramethylnon), as described by Drees et al. 2013, cited below. Some drenches contain botanical compounds, as described by Vogt et al. 2002 and Chen 2016, cited below, that can be pre-formulated as a liquid or purchased as powders/granules that are dissolved in water prior to application. The drenching liquid is poured in and around individual fire-ant mounds with the intent of delivering active ingredient to all of the ants within the mound. Drenching fire-ant mounds is precise and typically reduces ant populations within the mound more quickly than broadcast baits. However, mound-drenches often suppress the ant population within the mound but fail to prevent the ants from re-populating, e.g. when the treatment does not penetrate the mound's complex subterranean tunnel architecture or active ingredient is not sufficiently transferred to the queen(s).

Many of the same active ingredients used as liquid drenches can also be injected directly into mounds as aerosols or pressurized liquids, e.g. as described by Drees et al. 1996 and Reed & Smith 1999, cited below. Hot water and steam may also be injected into mounds, e.g. as described by Moffett & Fitzgerald 1993, Rawls 1998, and Schuster 2010, cited below. However, injecting steam or injecting liquid pesticides rather than pouring as a liquid can require specialized containers and/or equipment to pressurize the liquid and inject it. Injected pesticides can also lose efficacy in some circumstances, such as if ants are congregating near the surface of the mound, away from the site of injection.

There is a general desire for pesticidal treatments for fire ants, other ants, other insects, other arthropods, and/or other pests.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a pesticide release device configured for delivering a vaporizable and/or sublimateable pesticidal composition in vapor form to a pest habitat, a kit of parts for the pesticide release device, and a method of pesticidal treatment using the device. The pesticide release device comprises a rigid vapor injector extending along an axis from a distal end to a proximate end and defining: a chamber internal to the vapor injector; and a plurality of apertures along a surface of the vapor injector and in communication with the chamber, the plurality of apertures configured to allow the vaporizable and/or sublimateable pesticidal composition to flow from the chamber through one or more of the plurality of apertures into the pest habitat.

In some embodiments, the vapor injector tapers from the distal end to the proximate end, the proximate end relatively narrower than the distal end and configured to be driven into a substrate containing the pest habitat. In some embodiments, the vapor injector is conical.

In some embodiments, the vapor injector has a length along the axis of at least 20 cm. In some embodiments, the length of the vapor injector along the axis is no greater than 60 cm. In some embodiments, the vapor injector comprises a plurality of mateable segments, each of the mateable segments having respective lengths along the axis, when mated, no greater than 25 cm.

In some embodiments, the distal end is communicatively coupleable to a container containing the vaporizable and/or sublimateable pesticidal composition. In some embodiments, the device comprises an absorbent material carrying the vaporizable and/or sublimateable pesticidal composition, the absorbent material at least one of: disposed in the chamber and insertable into the chamber. In some embodiments, the device comprises a removable, sealable cover, the cover sealing the chamber such that the vaporizable and/or sublimateable pesticidal composition is confined to the chamber until the cover is removed.

In some embodiments, the plurality of apertures cover a proportion of a surface area of the vented injector in a range from 5% to 50%. In some embodiments, the proportion of the surface area of the vented injector covered by the plurality of apertures is in a range from 10% to 20%.

The method of pesticidal treatment comprises inserting a vapor injector containing a vaporizable and/or sublimateable pesticidal composition into substrate containing a pest habitat; and causing, by the inserting, the vaporizable and/or sublimateable pesticidal composition to flow through one or more apertures of the vapor injector into the pest habitat, the vaporizable and/or sublimateable pesticidal composition being in vapor form in at least a portion of the pest habitat.

In some embodiments, causing the vaporizable and/or sublimateable pesticidal composition to flow through one or more apertures of the vapor injector into the pest habitat comprises causing the vaporizable and/or sublimateable pesticidal composition to flow through one or more apertures of the vapor injector into the pest habitat as a liquid and the pesticidal composition vaporizing and/or sublimating within the pest habitat.

In some embodiments, causing the vaporizable and/or sublimateable pesticidal composition to flow through one or more apertures of the vapor injector into the pest habitat comprises causing the vaporizable and/or sublimateable pesticidal composition to flow through one or more apertures of the vapor injector into the pest habitat as a vapor.

In some embodiments, inserting the vapor injector into substrate containing the pest habitat comprises inserting at least a portion of the vapor injector into the pest habitat. In some embodiments, the pest habitat comprises an ant mound and inserting at least the portion of the vapor injector into the pest habitat comprises causing at least one aperture of the vapor injector to be in communication with a chamber of the ant mound. In some embodiments, the ant mound comprises a fire ant mound and inserting the vapor injector comprises inserting the vapor injector to a depth of at least 20 cm.

In some embodiments, inserting the vapor injector into substrate containing the pest habitat comprises driving a driving end of the vapor injector into the substrate. In some embodiments, inserting the vapor injector into substrate containing the pest habitat comprises forming a cavity in the substrate and inserting the vapor injector into the cavity.

The kit of parts for a pesticide release device configured for delivering a vaporizable and/or sublimateable pesticidal composition in vapor form to a pest habitat comprises a rigid vapor injector extending along an axis from a distal end to a proximate end and defining: a chamber internal to the vapor injector; and a plurality of apertures along a surface of the vapor injector and in communication with the chamber; a vaporizable and/or sublimateable pesticidal composition for delivery by the vapor injector.

In some embodiments, the kit comprises a container containing the pesticidal composition in liquid or solid form, the container couplable to the vapor injector. In some embodiments, the vapor injector comprises a mating portion at the distal end for coupling with the container. In some embodiments, the kit comprises an absorbent material dosed with the pesticidal composition, the absorbent material at least one of: inserted and insertable in the chamber. The kit may additionally or alternatively comprise any of the features of the above-described device.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 5A is a photograph of an example model fire ant tunnel system

FIG. 5B is a photograph of the example model fire ant tunnel system of FIG. 5A shown inside a garbage bin.

DESCRIPTION

Figure 1:
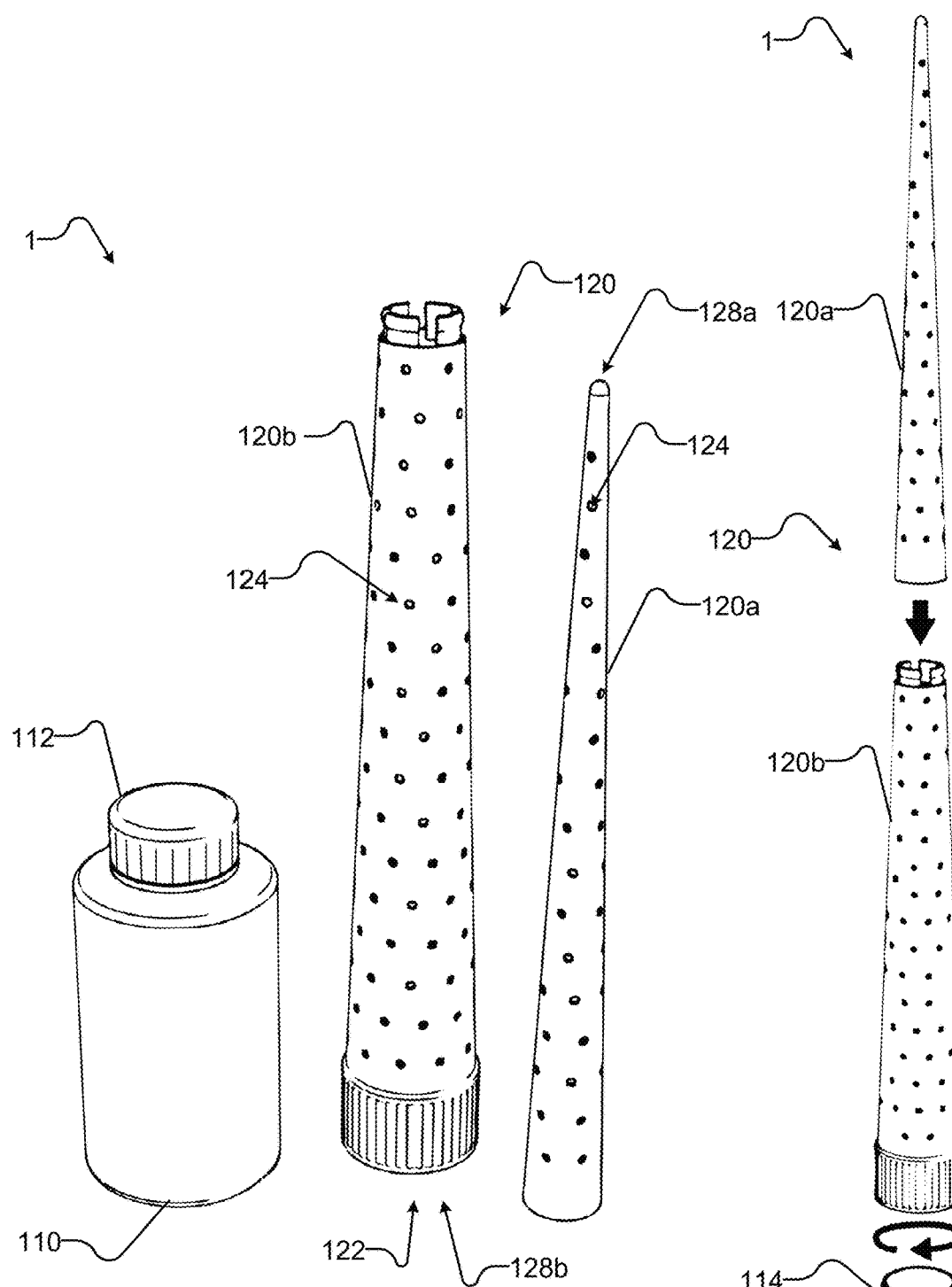
FIG. 1 shows an isometric view of an example container filled with liquid, vaporizable pesticide (left); a wide segment of vented spike (middle); and a narrow segment of vented spike (right).

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Release Device

The present disclosure provides a release device for a pesticidal composition. The release device may be used with any vaporizable and/or sublimateable pesticide, such as the pesticidal compositions described in U.S. Pat. No. 9,999,218 and/or US Patent Publication No. 2018/0116198 (referred to herein as the "releasable pesticide"). In at least some embodiments, the release device is suitable for use against subterranean pests (e.g. fire ants). The release device may be driven into and/or placed in a cavity within the soil, sand, and/or other substrate where the pests reside (referred to herein as "substrate"). The release device comprises a vapor injector which releases the pesticidal composition through apertures into the pest habitat, where it is distributed in vapor form.

In at least one example embodiment, the releasable pesticide is stored in a container such as a bottle, jar, flexible bag, and/or other container. The container may be made of plastic, metal, glass, and/or other suitable material. In at least some embodiments, such as the example release device 1 of FIGS. 1, 2, 3, and 4, a container 10 is threaded (e.g. at mating portion 114) to allow sealing with a threaded cap 112 and coupling with a mating portion 122 of a vented injector 120 (shown in greater detail in FIGS. 2, 3, and 4). Container 110 may be sealed using any suitable sealing method (e.g. threaded cap, induction seal, cap insert, friction cap, gasket, cork, etc.) to prevent leaking of the releasable pesticide during packaging, shipment or storage. The releasable pesticide may be stored as a solid, liquid, and/or gas. In at least the depicted embodiment, the releasable pesticide is stored as a liquid in a bottle 110 with a threaded cap 112.

The releasable pesticide, contained in a manner described above, is introduced into a pest habitat (such as a fire-ant mound) via a vented injector 120. In some embodiments, vented injector 120 comprises a rigid tapered housing (e.g. a rigid cone) extending and tapering along an axis, e.g. as shown in FIGS. 1, 2, 3, and 4. In some embodiments, vented injector 120 provides an internal chamber and apertures 124 (e.g. holes, slits, etc.) along at least a portion of its length along the axis, and optionally along substantially the entirety of its length along the axis. Apertures 124 are in communication with the internal chamber and allow for the releasable pesticide to flow from the internal chamber into the pest habitat. In some embodiments, an absorbent material 126 (e.g. cotton fibers, polyester fibers, sponge, and/or other material) is provided in the internal chamber of vented injector 120 (see, e.g., FIG. 3). Absorbent material 126 retains liquid releasable pesticides within vented injector 120 but allows evaporation of such liquids through apertures 124 of vented injector 120 and into the pest habitat.

In some embodiments, apertures 124 are distributed along substantially the entire length of vented injector 120. In some embodiments, apertures 124 are distributed roughly evenly across the surface area of vented injector 120. In some embodiments, apertures 124 provide coverage of at least 5% of the surface area of vented injector 120. In some embodiments, apertures 124 provide coverage of no more than half (50%) of the surface area of vented injector 120. In some embodiments, apertures 124 provide coverage over a portion of a surface area of vented injector 120 in a range from 10% to 20% (e.g. at least one tested embodiment provided coverage of roughly 15%). More coverage will generally allow more flow of the pesticide, but larger aperture diameter may cause ingress of soil (or other substrate) into the chamber, and more coverage may reduce the structural integrity of vented injector 120. Testing has shown that, for a 60 cm long and 5 cm wide (at the distal end) embodiment, 40 apertures with 1.5 cm diameter provided satisfactory efficacy, but other configurations are within the scope of the present disclosure.

Vented injector 120 comprises a proximate end 128a, for placement proximate to the pest habitat, and a distal end 128b, which often remains at or near the surface when vented injector 120 is inserted into substrate. In some embodiments vented injector 120 is adapted for driving into substrate, such that proximate end 128a comprises a driving end. For example, in some embodiments, such as the depicted embodiment of FIGS. 1-4, vented injector 120 is tapered and is relatively narrower at the driving end (at proximate end 128a) than at distal end 128b. Optionally, container 110 and/or distal end 128b of vented injector 120 can be provided with a sticky coating and/or guard to inhibit ants from climbing onto container 110 and/or distal end 128b of vented injector 120 during insertion into substrate.

Figures 3, 4:
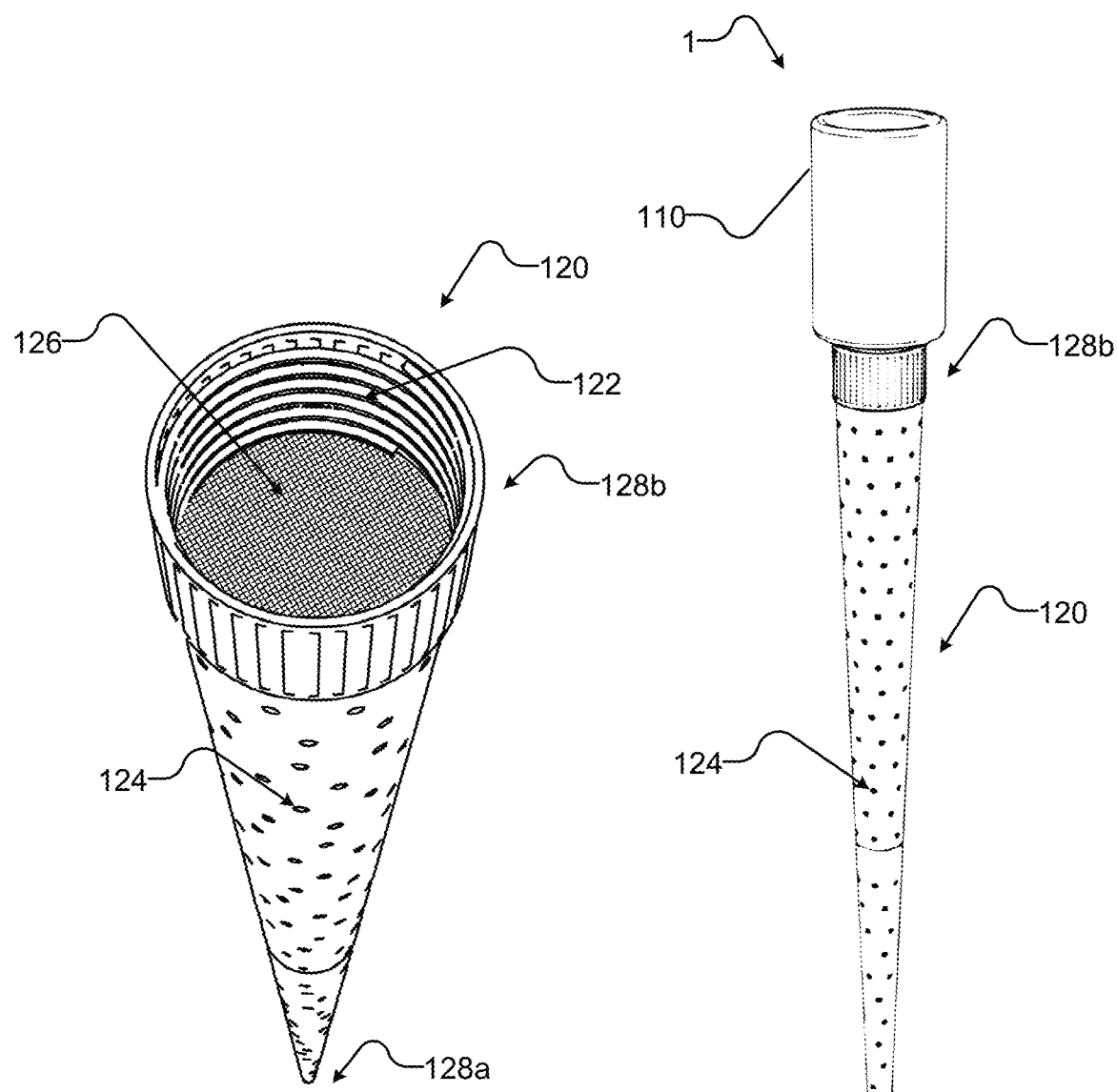
FIG. 3 shows an isometric view of the example vented spike of FIG. 1 assembled and filled with absorbent material to allow absorption of pesticidal liquid into the spike and evaporation of that liquid into a pest colony through the spike's vents.
FIG. 4 shows an isometric view of the example container and spike of FIG. 1, assembled and inverted to allow flow of liquid from the container into the spike, and to allow insertion into soil or other substrate where a pest colony exists.

In some embodiments, distal end 128b of the vented injector comprises a mating portion 122 comprising a threaded fitting that mates with threads of container 110 (e.g. at mating portion 114) to create a non-leaking (e.g. sealed) connection between vented injector 120 and container 110. Optionally, vented injector 120 and container 110 may mate via a bayonet-style connection, a snap-fit connection, friction-fit connection, and/or other suitable mating, and mating portions 114, 122 may be suitable adapted for such mating. In some embodiments, vented injector 120 does not necessarily require mating with container 110. For example, the releasable pesticide may be provided by an absorbent material 126 inserted and/or insertable into the internal chamber, e.g. as described below and/or as illustrated in FIG. 3.

In some embodiments, vented injector 120 extends for a distance in the range of about 20 cm to about 60 cm along the axis to allow insertion into galleries, chambers, and/or other subterranean structures of typical fire ant mounds. Even the deepest fire ant mounds will generally have structures in this range. Vented injectors 120 with lengths in this range (and particularly with lengths on the order of 60 cm) may thus, in suitable circumstances, distribute pesticidal vapors within a substantial range of fire ant mounds effectively. Vented injectors 120 with lengths of less than 20 cm are not necessarily ineffective in all cases—for instance, small fire ant mounds and/or fire ant mounds which are bordered below by formation, cement, and/or other firm substrate may be substantially shallower than 20 cm, and may be effectively treated with shorter vented injectors. Similarly, vented injectors 120 with lengths greater than 60 cm are not necessarily less effective. Accordingly, this disclosure does not exclude such shorter or longer embodiments. Indeed, in some embodiments, vented injector 120 extends for a distance of up to 70 cm, 80 cm, 90 cm, or 100 cm.

In some embodiments, vented injector 120 is divided into two or more shorter segments (i.e. shorter than the fully-assembled vented injector). FIGS. 1, 2, 3, and 4 show an example such embodiment having a proximate segment 120a and a distal segment 120b. The segments are mateable to each other via threads and/or other matings (e.g. as described above). Division of vented injector 120 into multiple shorter segments allows the disassembled vented injector to fit into a smaller-volume space (optionally along with the container) during shipping, storage and display.

Method of Use

Figure 2:
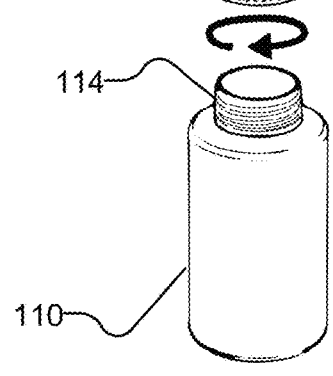
FIG. 2 shows schematically a method of assembly of narrow and wide segments of the vented spike of FIG. 1 with an unsealed container filled with liquid, vaporizable pesticide.

In some embodiments, container 110 is unsealed at the time of treatment to allow for the releasable pesticide to flow into the internal chamber of vented injector 120. Unsealing may comprise, for example, unscrewing or otherwise removing a threaded cap 112, peeling off an induction seal, piercing through a seal, and/or otherwise providing an aperture in the container. Mating portion 111 of vented injector 120 is mated with the container 110 (e.g. by threading with a mating portion 114 of container 110, such as is shown in FIG. 2). Optionally, separate vented injector 120 segments 120a, 120b are mated (e.g. by threading them together) to form a complete vented injector 120 before, after, and/or during mating with container 110.

In some embodiments, vented injector 120 is provided with an absorbent material 126 which is dosed with pesticidal liquid. Absorbent material 126 may be placed in an internal chamber of vented injector 120 at or prior to the time of use instead of, and/or in addition to, releasable pesticide flowing from container 110 into the internal chamber. In some embodiments, such as where absorbent material 126 is placed in such an internal chamber of vented injector 120 prior to the time of use, vented injector 120 may be sealed (e.g. by covering apertures of the vented injector with a sheath, peelable cover, and/or other sealing, removable cover).

Once an internal chamber of vented injector 120 has access to the releasable pesticide (e.g. by mating vented injector 120 and container 110, by inserting an absorbent material 126 dosed with the releasable pesticide, and/or otherwise providing for flow of the releasable pesticide into an internal chamber of vented injector 120), and, if applicable, once vented injector 120 has been assembled, vented injector 120 is inserted into soil, sand, and/or other substrate where a pest habitat (e.g. a fire-ant colony) exists. For example, a proximate end 128a of the vented injector may be driven into the substrate. Such proximate end 128a may comprise, for example, a relatively narrower end (relative to distal end 128b) of a tapered rigid housing of vented injector 120 axially opposing distal end 128b (and, in some embodiments, opposing mating portion 122). Vented injector 120 may provide a handle at or near the mating end, and/or container 110 may optionally be used as a handle to drive vented injector 120 into soil and/or other substrate. In some embodiments, inserting vented injector 120 comprises inverting container 110 and vented injector 120, thereby promoting the flow of pesticidal liquid from container 110 into an internal chamber of vented injector 120, and inserting (e.g. driving) vented injector 120 downwardly into the substrate. Once inserted, pesticidal liquid and/or vapor may flow from the internal chamber into the substrate, and particularly into chambers (i.e. tunnels, galleries, and/or other subterranean structures) of the pest habitat.

In some embodiments, a heater and/or a fan are provided (e.g. within, mated to, and/or proximate to vented injector 120) to promote evaporation of the releasable pesticide and to assist in distributing vapor into the substrate. In some embodiments, vented injector 120 comprises threaded flights (e.g. an auger-shaped vented injector 120, not shown) to allow for screwing of vented injector 120 into dense substrates, such as particularly dense soil, and inserting vented injector 120 into substrate comprises drilling vented injector 120 into the substrate. In some embodiments, distal end 128b of vented injector 120 comprises one or more protrusions extending radially (e.g. foot pegs) which can assist with insertion of vented injector 120 into ground by allowing a user to more easily step on the protrusion(s).

In some embodiments, release device 1 is provided with at least 60 ml of a liquid vaporizable pesticidal formulation, such as CIRKIL® or PROOF® pesticidal formulations (as a further example, formulations such as those disclosed in U.S. Pat. No. 9,999,227 and US Patent Publication No. 2016/0286782 may additionally or alternatively be used). In some embodiments, the release device is provided with a volume of liquid vaporizable pesticidal formulation in a range of 60 ml to 240 ml. In some embodiments, the release device is provided with a volume of approximately 120 ml of liquid vaporizable pesticidal formulation. As described below, experimental results support efficacy of the release device with such quantities of liquid vaporizable pesticidal formulation against at least some ant colonies. A larger or smaller volume of liquid vaporizable pesticidal formulation, and/or other pesticidal formulations, may be used without departing from the scope of the present disclosure. For example, in some embodiments release device 1 is provided with a volume of liquid vaporizable pesticidal formulation in a range of about 10 ml to 1 L. Quantities of pesticidal formulation may vary depending on the size and geometry of the mound, soil type, toxicity of the pesticide applied, pest species, environment, and/or other factors. In some embodiments, multiple release devices 1 may be inserted in or around a single pest habitat (e.g. a fire ant mound) to increase the volume and speed of pesticide evaporation into the mound, thus tending to increase the speed of kill and number of pests killed in a given time.

In at least some embodiments, releasable pesticides are released from release device 1, evaporate (passively and/or under pressure, pre- and/or post-release) into the substrate, and flow into chambers (i.e. tunnels, galleries, and/or other structures) of the pest habitat. In at least some circumstances, the pesticidal vapor released by release device 1 causes the death of all pests in the pest habitat (e.g. all fire ants in a mound, including queens). This potentially avoids an issue which can sometimes arise with various individual mound treatments, such as mound-drenches and injections, which sometimes fail because the active ingredient is not distributed to all parts of the pest habitat or to the areas where specific individuals, such as queen ants, are located.

For example, in Example 1 (described in greater detail below), an embodiment of the depicted release device 1 of FIG. 1 was used in combination with CIRKIL® pesticidal formulation. All ants (including queens) within a mound were killed in less than 4 hours. This speed of kill is several days faster than mound-drenching with the fastest acting pesticides, and several weeks faster than scattering baits (as described, for example, by Allen & Miller 2015, cited below). Surviving fire-ants can migrate to new areas within hours and establish a new colony; killing the entire mound population (and/or substantially the entire mound population) within 4 hours reduces or eliminates this ability of fire-ants to quickly relocate and establish new colonies.

Release device 1 does not necessarily require pressurized liquids, pressure-generating equipment, or vessels to contain pressurized materials. This allows the releasable pesticide and release device to be potentially be smaller, lighter, more portable, contained or delivered using a wider variety of materials, and/or cheaper to manufacture than alternatives such as pressurized/injected pesticides or steam. Pressurized embodiments are not excluded from the present disclosure, and pressurized liquids, pressure-generating equipment, or vessels to contain pressurized materials may optionally be provided.

Release device 1 allows the releasable pesticide to be filled and sealed into common consumer packaging using common filling methods and machinery. Addition of vented injector 120 that mates with container 110 (e.g. as shown in FIGS. 2 and 4) allows the releasable pesticide to flow deep into a pest habitat (such as a fire-ant mound). Because vented injector 120 may be divided into multiple segments (e.g. segments 120a, 120b), a kit of parts comprising a disassembled vented injector 120 and container 110 (e.g. as shown in FIG. 1) can be bundled to considerably smaller dimensions than the deployed configuration. For example, in some embodiments, vented injector 120 is divided into multiple segments 120a, 120b which fit on common retail shelves (e.g. with dimensions of no more than 25 cm tall, 12 cm wide, and 12 cm deep). This allows the entire formulation and release device to be shipped, stored and displayed in more physical locations than larger devices typically used to inject pesticides or steam into pest habitats such as fire-ant mounds.

In at least some embodiments, release device 1, in combination with a vaporizable or sublimated pesticide such as those described in U.S. Pat. No. 9,999,227 and US Patent Publication No. 2016/0286782, can be used to kill eggs, larvae and adults of other subterranean pests such as carpenter ants, termites, beetles and moths.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

EXAMPLE 1

A study was performed to determine if pesticidal liquid evaporated from a buried, vented release device described herein is capable of killing ants at all depths within a model fire ant tunnel system buried in soil or sand.

Figure 6A:
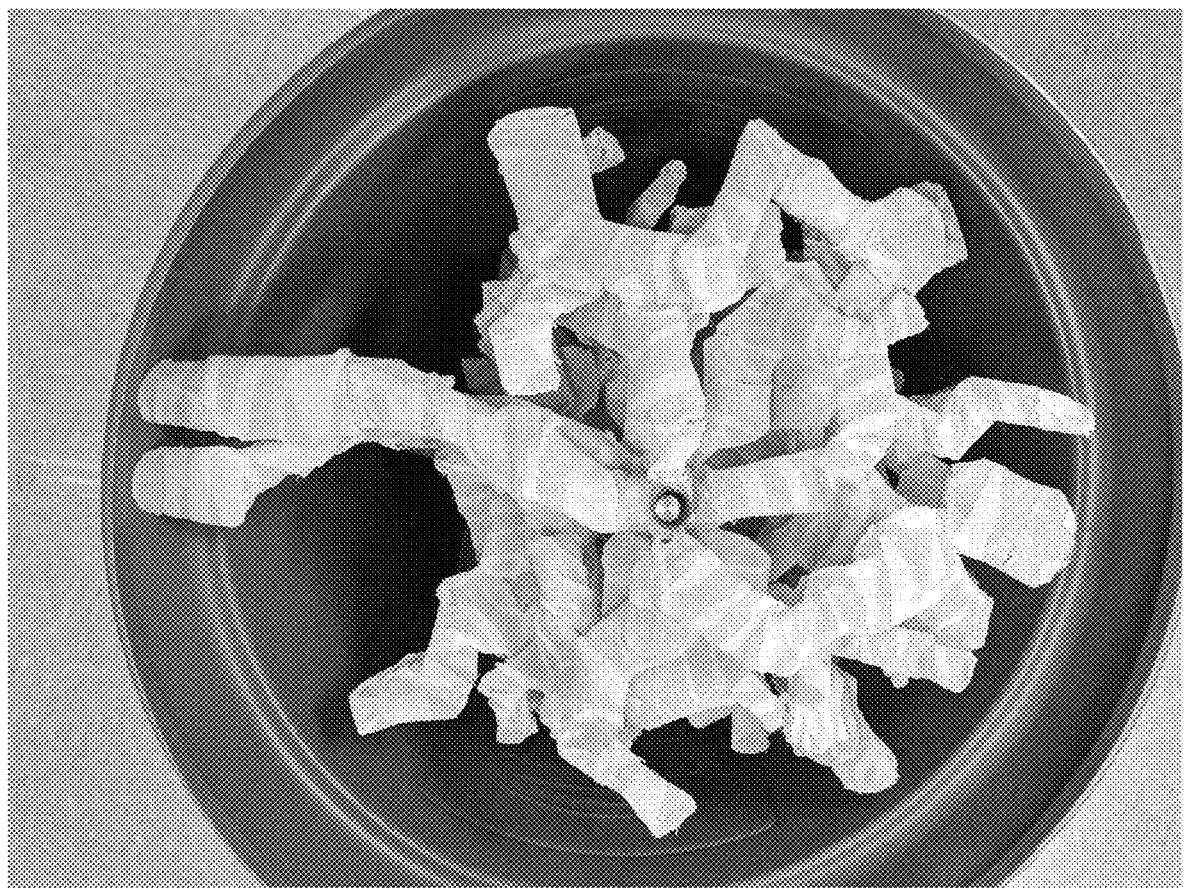
FIG. 6A is a photograph of the model fire ant tunnel system of FIG. 5A placed in a bin and shown from above.
Figure 6B:
FIG. 6B is a photograph of the model fire ant tunnel system of FIG. 6A placed inside a bin which has been filled with soil.
Figure 7:
FIG. 7 is a photograph of the bin of FIG. 6A and showing glass observation vials protruding from the bin and connected to the model tunnel system.

A model fire-ant tunnel system was created (44 cm in diameter and 55 cm tall) by joining a series of vapor-permeable wire and nylon mesh tubes to form a continuous series of tunnels and chambers around a central metal rod, as shown in FIG. 5. The diameters (0.5-3 cm) and lengths (5-22 cm) of connected tubes approximated that typically created by fire ants (as described by Cassill et al. 2002, cited below). One set of tunnels at the top, middle and bottom of the tunnel system ended with a mesh 10 ml glass vial divided from the tunnel by mesh, as shown in FIG. 7. This vial allowed containment and observation of ants placed within the model tunnel system. The tunnel system was placed inside a garbage bin measuring 50 cm in diameter and 75 cm tall before filling the bin with soil or sand, as shown in FIGS. 5 and 6.

120 ml of CIRKIL® pesticidal formulation was poured into a hollow vapor injector (5 cm in length, 5 cm diameter at the distal end, tapering to a point at the proximate end) filled with absorbent polyester fibers. The vapor injector provided apertures (40 holes, each measuring 1.5 cm in diameter) along its entire axial length to allow evaporation of liquid pesticidal formulation out of the vapor injector's internal chamber. The liquid-filled vapor injector was inserted 50 cm deep into the perimeter of soil or sand where the model fire-ant tunnel system was buried. The vapor injector remained in the soil for 24 hours at 20-21° C. and 30-70% relative humidity.

Pavement ant colonies, *Tetramorium caespitum*, were maintained in glass jars on sugar-water wicks and dog food, at ambient conditions (21° C., 30-60% relative humidity) in a laboratory. At the start of each test, groups of 5 adult ants were placed into each of the top, middle and bottom vials of the model tunnel system. At the start of each experiment a vapor injector was inserted into the soil or sand surrounding the tunnel system. Air and other vapor were able to travel into each vial through the continuous tunnel system but ants were prevented from leaving the vial because a vapor-permeable mesh was placed between the vial and the tunnel system, as shown in FIG. 7. Ants exposed to treatment vapors were observed after 4 hours to assess treatment efficacy, then again after 24 hours to verify mortality. Dead ants were defined as those that demonstrated no movement after gentle tapping of the vial. Three replicate tests were performed using vapor injectors inserted into soil and 2 replicate tests were performed using vapor injectors inserted into sand.

Figure 8:
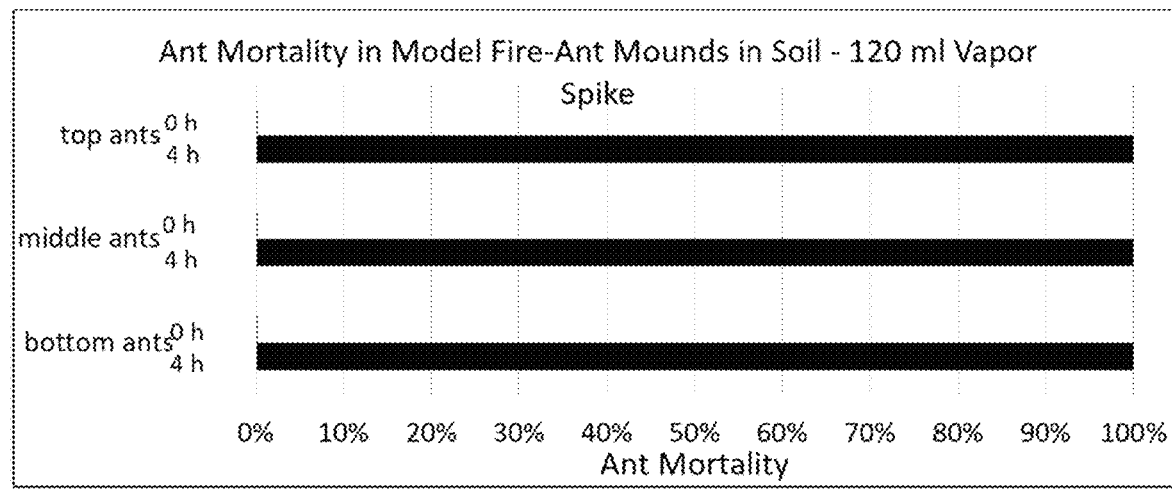
FIG. 8 is a table of pavement ant mortality in a model fire-ant mound buried in soil at time 0-hours and after 4-hours, after treatment with a vented vapor spike filled with 120 ml of an example insecticidal formulation. Ant mortality was observed at the top, middle and bottom of the model fire-ant mound (n=3 top replicates, 3 middle replicates and 3 bottom replicates; 5 ants per replicate).

When the vapor injector (containing 120 ml of pesticidal formulation) was inserted into potting soil surrounding the tunnel system, 100% of ants at the top, middle and bottom of the mound were killed within 4 hours. An average of 49.42 g of formulation evaporated into the soil and tunnel system within the first 4 hours of testing, as shown in FIG. 8 and Table 1).

Figure 9:
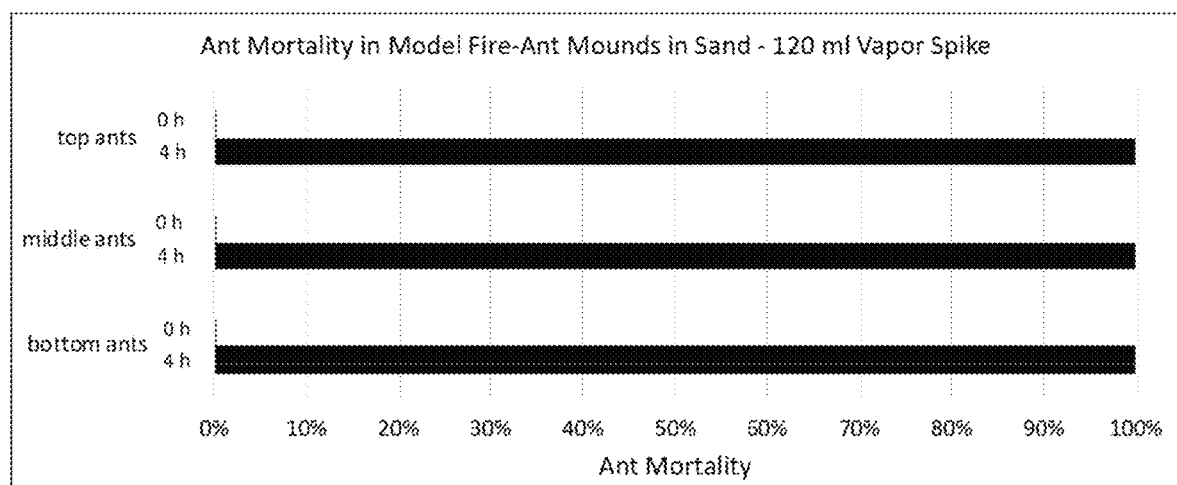
FIG. 9 is a table of pavement ant mortality in a model fire-ant mound buried in sand at time 0-hours and after 4-hours, after treatment with a vented vapor spike filled with 120 ml of an example insecticidal formulation. Ant mortality was observed at the top, middle and bottom of the model fire-ant mound (n=2 top replicates, 2 middle replicates and 2 bottom replicates; 5 ants per replicate).

Similarly, when the vapor injector (containing 120 ml of formulation) was inserted into sand surrounding the tunnel system, 100% of ants at the top, middle and bottom of the mound were killed within 4 hours. An average of 37.08 g of formulation evaporated into the sand and tunnel system within the first 4 hours of testing, as shown in FIG. 9 and Table 1).

The apertures of the tested release device comprised 40 holes, each measuring 1.5 cm in diameter, providing roughly 15% coverage of the vapor injector's surface area. Tests with reduced aperture coverage (e.g. less than 5% coverage) found reduced efficacy.

These results indicate that 120 ml of CIRKIL® pesticidal formulation will tend to successfully evaporate from a vapor injector driven into soil or sand (as described above). In at least these experimental circumstances, sufficient vapor permeated the substrate, and all tunnels and chambers within 4 hours to kill all ants residing in those tunnels and chambers, regardless of their depth below the substrate. This result is observed in both soil and sand substrates, as shown in FIGS. 8 and 9 and Table 1.

Table 1

The following table presents experimental results from the study of Example 1. It includes ant mortality at the top, middle and bottom of the treated mound after each treatment, and the mass of liquid evaporated into the soil, sand and tunnel system after each treatment had run for 4 hours.

| Model Fire-Ant Mound Inserted Into Potting Soil | | | | |
| --- | --- | --- | --- | --- |
| Replicates | Ant Mortality at time 0 | Ant Mortality after 4 h | Ant Mortality after 24 h | mass of liquid evaporated |
| top ants | 0/5 | 5/5 | 5/5 | 49.2 g |
| middle ants | 0/5 | 5/5 | 5/5 | |
| bottom ants | 0/5 | 5/5 | 5/5 | |
| top ants | 0/5 | 5/5 | 5/5 | 40.48 g |
| middle ants | 0/5 | 5/5 | 5/5 | |
| bottom ants | 0/5 | 5/5 | 5/5 | |
| top ants | 0/5 | 5/5 | 5/5 | 42.75 g |
| middle ants | 0/5 | 5/5 | 5/5 | |
| bottom ants | 0/5 | 5/5 | 5/5 | |
| Average Mortality | | | | |
| top ants | 0% | 100% | 100% | Avg. mass loss = 44.14 g |
| middle ants | 0% | 100% | 100% | |
| bottom ants | 0% | 100% | 100% | |

| Model Fire-Ant Mound Inserted Into Sand | | | | |
| --- | --- | --- | --- | --- |
| Replicates | Ant Mortality at time 0 | Ant Mortality after 2 h | Ant Mortality after 24 h | mass of liquid evaporated |
| top ants | 0/5 | 5/5 | 5/5 | 33.04 g |
| middle ants | 0/5 | 5/5 | 5/5 | |
| bottom ants | 0/5 | 5/5 | 5/5 | |
| top ants | 0/5 | 5/5 | 5/5 | 41.12 g |
| middle ants | 0/5 | 5/5 | 5/5 | |
| bottom ants | 0/5 | 5/5 | 5/5 | |
| Average Mortality | | | | |
| top ants | 0% | 100% | 100% | Avg. mass loss = 37.08 g |
| middle ants | 0% | 100% | 100% | |
| bottom ants | 0% | 100% | 100% | |

REFERENCES

The following documents are incorporated by reference herein in their entirety:

Adams B J, Hooper-Bui L M, Strecker R M, O'Brien D M (2011). Raft formation by the red imported fire ant, *Solenopsis invicta*. Journal of Insect Science 11:171.

Allen H R, Miller D M (2015). Field evaluations of Broadcast, and Individual Mound Treatments for Red Imported Fire Ant, *Solenopsis invicta* Buren, (Hymenoptera: Formicidae) Control in Virginia, USA. Sociobiology 62:10-17.

Barr C L, Drees B M (1994). Results from the Texas veterinarian survey: Impact of red imported fire ants on animal health. In: Proc, 1994 Imported Fire Ant Conference. May 9-11. Mobile, AL. 12.

Callcott A M A, Porter S D, Weeks R D J, Graham L C F, Johnson S J, Gilbert L E (2011). Fire ant decapitation fly cooperative release programs (1994-2008): two Pseudacteon species, *P. tricuspis* and *P. curvatus*, rapidly expand across imported fire ant populations in the southeastern United States. Journal of Insect Science 11:19.

Cassill D, Tschinkel W R, Vinson S B (2002). Nest complexity, group size and brood rearing in the fire ant, *Solenopsis invicta*. Insectes Sociax 49:158-163.

Chen J (2016). Toxicity and efficacy of two emulsifiable concentrates of tridecanone against red imported fire ants. Advances in Entomology 4:37-46.

Drees B M, Barr C L, Vinson S B, Gold R E, Merchant M E Kostroun D (1996). Managing imported fire ants in urban areas. Texas Agricultural Extension Service B-6043, 15M-9-96-revision.

Drees B M, Calixto A A, Nester P R (2013). Integrated pest management concepts for red imported fire ants *Solenopsis invicta* (*Hymenoptera*: Formicidae). Insect Science 20:420-438.

Evans C W (1986) U.S. Pat. No. 4,756,118A. Method and apparatus for the destruction of imported fire ants of the genus *Solenopsis*.

Hemmer W (2014). Cross reactions between *Hymenoptera* venoms from different families, genera and species. Hautarzt. 65 (9): 775-9.

Huanjiong W, Hui W, Zexing T A O, Quansheng G E (2018). Potential range expansion of the red imported fire ant (*Solenopsis invicta*) in China under climate change. Journal of Geographical Science.

Jennings C (2004). Notes from the field: A brief history of the red imported fire ant eradication program. The Australian Journal of Emergency Management 19:97-100.

Jetter K M & Klotz J H (2002). Eradication costs calculated: Red imported fire ants threaten agriculture, wildlife and homes. California Agriculture 56:26-34.

Kruse B, Anderson J & Simon L V (updated 2019). Fire Ant Bites. In: StatPearls. StatPearls Publishing 2019. https://www.ncbi.nlm.nih.gov/books/NBK470576/.

Lard C F, Hall C, Salin V (2001). The economic impact of the red imported fire ant on the homescape, landscape, and the urbanscape of selected metroplexes of Texas: a part of the Texas fire ant initiative 1997-1999.

Manhas K, Rozek A (2012) U.S. Pat. No. 9,999,227. Pest control formulations and methods of making and using same.

Manhas K, Rozek A, Woodbury N, Lentz S, Takeuchi R J E, Ozeroff S (2014) Patent US20160286782A1. Compositions, devices and methods for control of pests using vapor activity.

Moffett D, Fitzgerald R E (1993) U.S. Pat. No. 5,319,878. Method and apparatus for extermination of imported fireants.

Moloney S & Vanderwoude C (2002). Red imported fire ants: A threat to eastern Australia's wildlife? Ecological Management and Restoration 3:167-175.

Na J P S & Lee C Y (2001). Identification key to common urban pest ants in Malaysia. Tropical Biomedicine 18:1-17.

Nester P R, Pucket R T, Flanders K, Palmer K, Graham F, Suiter D, Davis, T, Vail K, Hopkins J, Loftin K, Ring D (2019). Broadcast baits for fire ant control-ant pests. Available at: https://ant-pests.extension.org/broadcast-baits-for-fire-ant-control/[accessed Dec. 9 2019].

Prahlow J A & Barnard J J (1998). Fatal anaphylaxis due to fire ant stings. The American Journal of Foresnic Medicine and Pathology 19:137-142.

Porter S D, Nogueira de Sá LA & Morrison L W (2004) Establishment and dispersal of the fire ant decapitating fly Pseudacteon tricuspis in North Florida. Biological Control 29:179-188.

Rawls H (2004) US Patent Publication 2005/0155278. Fire ant eradication method.

Reed J T, Smith D B (1999). Comparison of two treatment methods and four insecticides for control of individual fire ant mounds. Mississippi Agricultural and Forestry Experiment Station Bulletin b1080.

Schuster (2010) U.S. Pat. No. 8,677,680. Fire ant suppression system.

Vander Meer R K & Milne D E (2017). Enhanced pest ant control with hydrophobic bait. Journal of Economic Entomology 110:567-574.

Villada G, Hafeez F, Ollague J, Nousari C H, Elgart G W (2017). Imported fire ant envenomation: A clinicopathologic study of a recognizable form of arthropod assault reaction. J. Cutan. Pathol. 44 (12): 1012-1017.

Vinson S B (1997). Invasion of the red imported fire ant (*Hymenoptera*: Formicidae): Spread, biology, and impact. Am. Entomol. 43:23-39.

Vogt J T, Shelton T G, Merchant M E, Russell S A, Tanley M J, Appel A G (2002) Efficacy of three citrus oil formulations against *Solenopsis invicta* buren (*Hymenoptera*: Formicidae), the red imported fire ant. Journal of Agricultural Entomology 19:159-171.

Williams D F (1983). The development of toxic baits for the control of the imported fire ant. Florida Entomologist 66:162-172.

Williams D F (1994). Control of the introduced pest, the imported fire ant, *Solenopsis invicta*, in the United States. in: Exotic ants: biology, impact, and control of introduced species. Westview Press, Boulder (CO). pp. 282-292

Witherspoon P R (1989) U.S. Pat. No. 5,054,231. Fire ant eradication apparatus and method.

Wodjcik D P (1983). Symposium on imported fire ants: Comparison of the ecology of red imported fire ants in North and South America. Florida Entomologist 66:101-111.

Wodjcik D P, Allen C R, Brenner R J, Forys E A, Jouvenaz D P (2001). Red imported fire ants: impact on biodiversity. Nebraska Cooperative Fish & Wildlife Reserach Unit-Staff Publications. 47.

Wylie R, Jennings C, McNaught M K, Oakey J, Harris E J (2016). Eradication of two incursions fo the red imported fire ant in Queensland, Australia. Ecological Management & Restoration 17:22-32.

Yu-Tzu C (2004). Agencies will collaborate to control outside species. Taipei Times. Taipei, Taiwan. May 2, p. 2.

Citations to non-patent literature throughout the specification are to the foregoing documents.

What is claimed is:

1. A pesticide release device configured for delivering a vaporizable and/or sublimateable pesticidal composition in vapor form to a pest habitat that includes:
 a container that is configured to store the vaporizable and/or sublimateable pesticidal composition; and
 a rigid vapor injector comprising:
  a first segment that defines a height between a proximal end that is narrower than a distal end that includes a mating portion, and a second segment that defines a height between a proximal end that includes a first mating portion that is configured to mate with the first segment and a distal end that includes a second mating portion that is configured to mate directly to the container that is configured to store the vaporizable and/or sublimateable pesticidal composition, wherein the first segment and the second segment have respective heights of no greater than 25 cm, wherein when the vapor injector is in an assembled configuration there is a chamber internal to both the first segment and the second segment, wherein a plurality of apertures are disposed along respective outer surfaces of both the first segment and the second segment of the vapor injector, are in communication with the chamber, and are configured to allow the vaporizable and/or sublimateable pesticidal composition to flow from the chamber directly into the pest habitat when the device is in an assembled configuration, wherein the outer surface of the first segment is tapered along the entire height of the first segment, and wherein the outer surface of the second segment is tapered along the entire height of the second segment.

2. The device according to claim 1 wherein the proximal end of the first segment is configured to be driven into a substrate containing the pest habitat.

3. The device according to claim 2, wherein the vapor injector is conical when in an assembled configuration.

4. The device according to claim 1, wherein the vapor injector has a total height of between about 20 cm and about 60 cm when in an assembled configuration.

5. The device according to claim 4, wherein each of the first segment and the second segment have the same respective heights.

6. The device according to claim 1 further comprising an absorbent material carrying the vaporizable and/or sublimateable pesticidal composition.

7. The device according to claim 6 further comprising a removable, sealable cover.

8. The device according to claim 1, wherein the plurality of apertures covers a proportion of a surface area of the injector in a range from 5% to 50%.

9. The device according to claim 8, wherein the proportion of the surface area of the injector covered by the plurality of apertures is in a range from 10% to 20%.

10. The device according to claim 1, wherein the second mating portion on the distal end of the second segment is communicatively coupleable to the container that is configured to store the vaporizable and/or sublimateable pesticidal composition using a threaded cap that is configured to receive a threaded mating portion of the container.

11. A kit of parts for a pesticide release device configured for delivering a vaporizable and/or sublimateable pesticidal composition in vapor form to a pest habitat, comprising:

a container that is configured to store the vaporizable and/or sublimateable pesticidal composition; and a rigid vapor injector comprising at least two mateable segments extending along an axis from a distal end comprising a mating portion that is configured to couple directly to the container that is configured to store the vaporizable and/or sublimateable pesticidal composition to a proximal end, the rigid vapor injector defining an injector height along the axis between the proximal end and the mating portion and further defining:

a chamber internal to the at least two mateable segments of the vapor injector; and a plurality of apertures that are disposed along respective surfaces of each of the at least two mateable segments of the vapor injector and that are in communication with the chamber;

wherein the plurality of apertures are configured for the vaporizable and/or sublimateable pesticidal composition to flow from the chamber directly into the pest habitat, wherein an outer surface of the rigid vapor injector is tapered along the entire injector height, wherein the at least two mateable segments each define a height measured along an axis extending from the distal end to the proximal end of each of the at least two mateable segments respectively, and wherein the at least two mateable segments have respective heights of no greater than 25 cm.

12. The kit according to claim 11, wherein the container contains the pesticidal composition in liquid or solid form, and the container is couplable to the vapor injector using a threaded cap that is configured to receive a threaded mating portion of the container.

13. The kit according to claim 11 further comprising an absorbent material dosed with the pesticidal composition.

14. The kit according to claim 11, wherein the height of the at least two mateable segments are the same.

* * * * *